United States Patent
Tsubaki et al.

(10) Patent No.: US 8,974,902 B2
(45) Date of Patent: Mar. 10, 2015

(54) JOINED BODY AND METHOD OF PRODUCING JOINED BODY

(75) Inventors: Hiroyuki Tsubaki, Ibaraki (JP); Shinji Inokuchi, Ibaraki (JP); Takuma Ogawa, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 160 days.

(21) Appl. No.: 13/543,376

(22) Filed: Jul. 6, 2012

(65) Prior Publication Data

US 2013/0011670 A1    Jan. 10, 2013

(30) Foreign Application Priority Data

Jul. 8, 2011    (JP) .................. 2011-152192

(51) Int. Cl.

| | |
|---|---|
| B32B 27/00 | (2006.01) |
| B32B 15/04 | (2006.01) |
| C09J 5/00 | (2006.01) |
| C08L 23/28 | (2006.01) |
| C09J 7/02 | (2006.01) |
| C09D 123/28 | (2006.01) |
| C09J 133/04 | (2006.01) |
| C08L 23/02 | (2006.01) |

(52) U.S. Cl.
CPC ............. *C08L 23/283* (2013.01); *C09J 7/0217* (2013.01); *C09J 123/283* (2013.01); *C09J 133/04* (2013.01); *C09J 7/0296* (2013.01); *C08L 23/02* (2013.01); *C09J 2411/003* (2013.01)
USPC ............................ 428/353; 156/322; 156/334

(58) Field of Classification Search
None
See application file for complete search history.

(56) References Cited

U.S. PATENT DOCUMENTS

| | | | |
|---|---|---|---|
| 4,303,697 A | | 12/1981 | Baseden |
| 4,778,724 A | * | 10/1988 | Bragole ..................... 428/414 |
| 4,859,540 A | | 8/1989 | Bragole |
| 5,677,376 A | * | 10/1997 | Groves ........................ 525/73 |
| 6,287,685 B1 | | 9/2001 | Janssen et al. |
| 2010/0035057 A1 | * | 2/2010 | Ishida ......................... 428/353 |
| 2011/0076489 A1 | | 3/2011 | Nonaka et al. |

FOREIGN PATENT DOCUMENTS

| | | |
|---|---|---|
| EP | 0 696 610 A2 | 2/1996 |
| JP | 07-034038 | 2/1995 |
| JP | 09-263733 | 10/1997 |
| JP | 2001-525481 A | 12/2001 |
| JP | 2008-184542 A | 8/2008 |
| JP | 2009-242763 | 10/2009 |
| JP | 2009-286882 A | 12/2009 |
| WO | 96/02048 | 1/1996 |

OTHER PUBLICATIONS

European Search Report issued in Application No. 12175300.8 dated Sep. 13, 2012.

Notification of Reason(s) for Refusal issued in corresponding JP Application No. 2011-152192, dated Jan. 20, 2015.

* cited by examiner

*Primary Examiner* — Sheeba Ahmed
(74) *Attorney, Agent, or Firm* — Sughrue Mion, PLLC (57) ABSTRACT

A joined body includes: an adherend; a primer layer provided on the adherend; and a pressure-sensitive adhesive layer provided on the primer layer. The primer layer contains, as an effective component, at least one of chlorinated polypropylene and chlorinated polyethylene and an amount of the effective component per unit area is 0.5 [mg/cm$^2$] or less. The surface of the adherend may be formed of at least one of polypropylene (PP), polyvinyl chloride (PVC), and ethylene-propylene-diene rubber (EPDM).

8 Claims, 2 Drawing Sheets

JOINED BODY AND METHOD OF PRODUCING JOINED BODY

CROSS-REFERENCE TO RELATED APPLICATIONS

This application is based upon and claims the benefit of priority from the prior Japanese Patent Application No. 2011-152192, filed on Jul. 8, 2011, the entire contents of which are incorporated herein by reference.

BACKGROUND OF THE INVENTION

1. Field of the Invention

The present invention relates to a joined body and a method of producing a joined body.

2. Description of the Related Art

Adhesion methods capable of being applied to adherends that are difficult to be adhered have been conventionally developed. For example, Japanese Patent Application Publication (Translation of PCT Application) No. 2001-525481 discloses a laminated member comprising, between a pressure-sensitive adhesive layer and a rubber product, a thermally-activated adhesive component having an undercoating layer in order to achieve a durable joint between the rubber product and another component. In addition, Japanese Patent Application Publication No. 2008-184542 discloses a method of applying, when a member made of a material other than polyolefin-based materials is joined, via an adhesive, to a substrate made of a polyolefin-based material that has poor adhesiveness, a primer onto the surface of the substrate.

However, there is the possibility that a suitable adhesion performance may not be obtained depending on the type, an application method, application amount, or the like, of the primer.

SUMMARY OF THE INVENTION

The present invention has been made in view of these situations, and a purpose of the invention is to provide a technique for improving the adhesion reliability between an adherend and a pressure-sensitive adhesive layer.

In order to solve the aforementioned problem, a joined body according to an embodiment of the present invention comprises: an adherend; a primer layer formed on the adherend; and a pressure-sensitive adhesive layer provided on the primer layer. The primer layer contains, as an effective component, at least one of chlorinated polypropylene and chlorinated polyethylene and an amount of the effective component per unit area is 0.5 $[mg/cm^2]$ or less.

According to the embodiment, the adhesion reliability between an adherend and a pressure-sensitive adhesive layer can be improved.

The surface of the adherend may be formed of at least one of polypropylene (PP), polyvinyl chloride (PVC), and ethylene-propylene-diene rubber (EPDM). The pressure-sensitive adhesive layer may be formed of an acrylic pressure-sensitive adhesive composition that contains a fine particle and/or a bubble. Part of the pressure-sensitive adhesive layer may remain on the surface of the adherend when the pressure-sensitive adhesive layer has been released from the adherend.

Another embodiment of the present invention is a method of producing a joined body. This method comprises: applying a primer solution containing, as an effective component, at least one of chlorinated polypropylene and chlorinated polyethylene onto the surface of an adherend to form a primer layer; and pasting a pressure-sensitive adhesive layer onto the primer layer. In the applying of a primer solution, an application amount of the primer solution is set such that an amount of the effective component of the primer layer per unit area is 0.5 $[mg/cm^2]$ or less.

According to this embodiment, a joined body in which the adhesion reliability between an adherend and a pressure-sensitive adhesive layer has been improved can be produced.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Hereinafter, the preferred embodiments of the present invention will be described with reference to the accompanying drawings and tables. The thickness or the ratio of the size of each layer in each drawing does not necessarily represent an actual embodiment correctly, but is appropriately changed for convenience of explanation.

(Joined Body)

Figure 1:
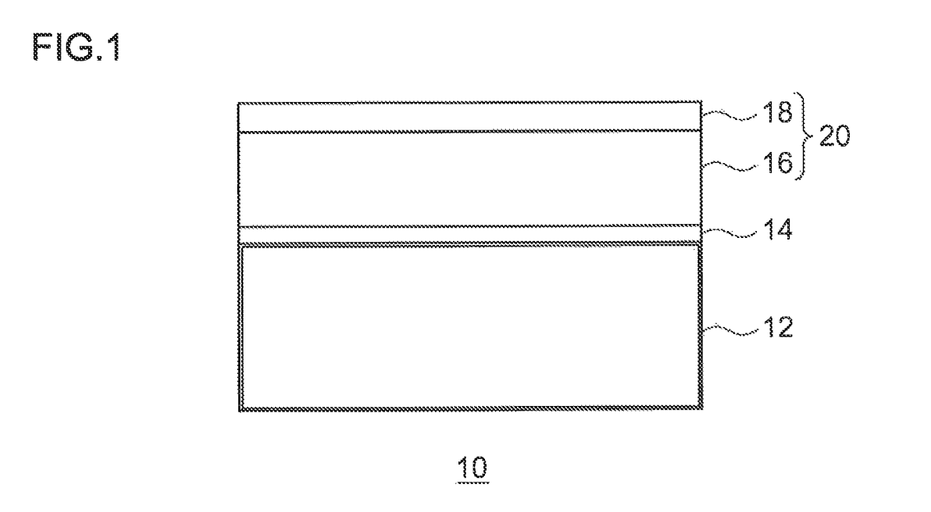
FIG. 1 is a schematic sectional view illustrating the structure of a joined body according to an embodiment.

FIG. 1 is a schematic sectional view illustrating the structure of a joined body 10 according to an embodiment. The joined body 10 comprises: an adherend 12; a primer layer 14 formed on the adherend 12; a pressure-sensitive adhesive layer 16 provided on the primer layer 14; and a release liner 18 provided on the pressure-sensitive adhesive layer 16. The pressure-sensitive adhesive layer 16 and the release liner 18 form a pressure-sensitive adhesive tape 20.

In the joined body 10, the pressure-sensitive adhesive layer 16 is provided above the adherend 12 in advance in order to make the workability, occurring when the adherend 12 is pasted to a component to be joined, to be easy in assembling, for example, home electronic appliances or automobile exterior parts.

(1: Adherend)

A technique according to the present embodiment is particularly suitable for an adherend made of a material difficult to be adhered to a pressure-sensitive adhesive layer. Although various adherends can be exemplified as the adherend made of such a material, for example, a material having a low surface energy is included in such a material. Specifically, the technique according to the embodiment is suitable for an adherend, at least part of the surface of which is made of a material, such as polypropylene (PP), polyvinyl chloride (PVC), ethylene-propylene-diene rubber (EPDM), acrylonitrile-butadiene-styrene (ABS), or acrylonitrile-ethylene-propylene-diene-styrene.

(2: Primer Layer)

The primer layer 14 is formed of a primer containing chlorinated polyolefin as an effective component. It is preferable that the primer contains chlorinated polyolefin as an effective component and is uniformly dispersed in an organic solvent. The primer may contain an aliphatic isocyanate-containing compound and an organic functional group-containing non-halogenated hydrocarbon polymer. It is more preferable that the primer contains, as an effective component, at least one of chlorinated polypropylene and chlorinated polyethylene. A wide variety of types of organic solvents, including aliphatic esters, aliphatic hydrocarbons, aromatic hydrocarbons, and halogenated aromatics, can be used as the organic solvent.

Examples of the organic solvent include, but not limited thereto, cyclohexane, xylene, heptane, toluene, hexane, ethyl acetate, isopropyl alcohol, and methyl ethyl ketone. The chlorinated polyolefin is contained preferably in an amount of approximately 0.25% by weight to approximately 25% by weight, and more preferably in an amount of approximately 1% by weight to approximately 10% by weight, based on the total weight of the primer composition. The organic solvent is contained preferably in an amount of at least approximately 75% by weight based on the total weight of the primer composition. The primer layer 14 has the function of improving the chemical binding force or adhesion force between the pressure-sensitive adhesive layer 16 and the adherend 12 in the pressure-sensitive adhesive tape 20, as well as the function of protecting the pressure-sensitive adhesive tape 20 from a low molecular weight component bleeding from the adherend 12.

(3: Pressure-Sensitive Adhesive Tape)

Figure 2:
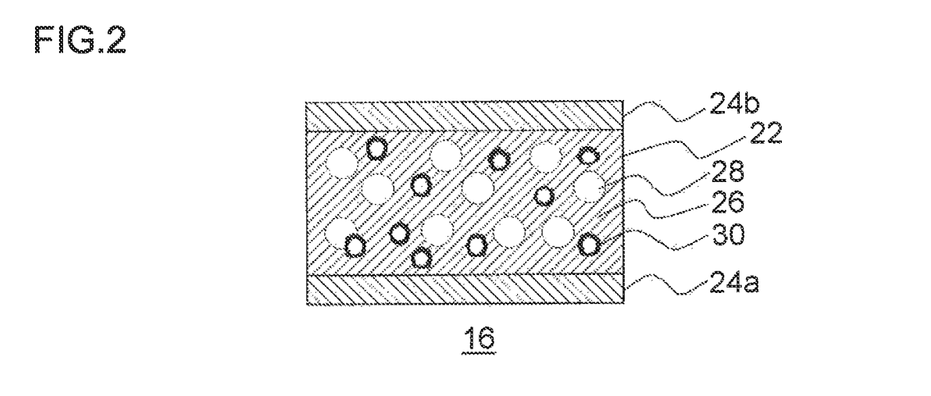
FIG. 2 is a schematic sectional view illustrating an example of the structure of a pressure-sensitive adhesive layer according to the embodiment.

As stated above, the pressure-sensitive adhesive tape 20 has the pressure-sensitive adhesive layer 16 and the release liner 18. FIG. 2 is a schematic sectional view illustrating an example of the structure of the pressure-sensitive adhesive layer 16 according to the embodiment.

(3-1: Pressure-Sensitive Adhesive Layer)

The pressure-sensitive adhesive layer 16 includes: a core layer 22; a surface layer 24a provided on one of the surfaces of the core layer 22; and a surface layer 24b provided on the other surface thereof. Hereinafter, the surface layers 24a and 24b are collectively referred to as a surface layer 24. The core layer 22 has: a pressure-sensitive adhesive composition 26; a fine particle 28 contained in the pressure-sensitive adhesive composition 26; and a bubble 30 formed in the pressure-sensitive adhesive composition 26. Alternatively, the pressure-sensitive adhesive composition 26 may contain one of the fine particle 28 and the bubble 30. It is preferable, from the viewpoint of formation of a joined body having higher adhesion reliability, that the pressure-sensitive adhesive layer 16 according to the present embodiment is formed of an acrylic pressure-sensitive adhesive composition that contains a fine particle and/or a bubble. Hereinafter, each component of the core layer 22 will be described in detail.

(3-1-1: Pressure-Sensitive Adhesive Composition)

An acrylic polymer (A) is used as the pressure-sensitive adhesive composition 26 that forms the core layer 22. For example, the acrylic polymer (A) contains, as a monomer unit, (meth)acrylic acid alkyl ester having a $C_{1\text{-}20}$ linear or branched alkyl group in an amount of approximately 50% by weight or more. Alternatively, the acrylic polymer (A) may have a structure formed by (meth)acrylic acid alkyl ester having a $C_{1\text{-}20}$ alkyl group alone or by a combination of two or more thereof. The acrylic polymer (A) can be obtained by subjecting a (meth)acrylic acid alkyl ester to polymerization (e.g., solution polymerization, emulsion polymerization, UV polymerization), along with a polymerization initiator.

The ratio of the (meth)acrylic acid alkyl ester having a $C_{1\text{-}20}$ alkyl group is approximately 50% by weight or more and 99.9% by weight or less, preferably approximately 60% by weight or more and 95% by weight or less, and more preferably approximately 70% by weight or more and 93% by weight or less, based on the total weight of the monomer components for preparing the acrylic polymer (A).

Examples of the (meth)acrylic acid alkyl ester having a $C_{1\text{-}20}$ alkyl group include, for example: (meth)acrylic acid $C_{1\text{-}20}$ alkyl esters [preferably (meth)acrylic acid $C_{2\text{-}14}$ alkyl esters, more preferably (meth)acrylic acid $C_{2\text{-}10}$ alkyl esters, and most preferably (meth)acrylic acid $C_{4\text{-}8}$ alkyl esters], such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid heptyl, (meth)acrylic acid octyl, (meth)acrylic acid 2-ethylhexyl(2-ethylhexyl(meth)acrylate), (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, (meth)acrylic acid dodecyl, (meth)acrylic acid tridecyl, (meth)acrylic acid tetradecyl, (meth)acrylic acid pentadecyl, (meth)acrylic acid hexadecyl, (meth)acrylic acid heptadecyl, (meth)acrylic acid octadecyl, (meth)acrylic acid nonadecyl, and (meth)acrylic acid eicosyl. Among them, acrylic acid butyl, acrylic acid 2-ethylhexyl, and acrylic acid octyl can be preferably used. In addition, the "(meth)acrylic acid alkyl ester" means an acrylic acid alkyl ester and/or a methacrylic acid alkyl ester, and all of the "(meth) . . . " expressions have the same meaning.

Examples of the (meth)acrylic acid ester other than the (meth)acrylic acid alkyl ester include, for example: (meth)acrylic acid esters having an alicyclic hydrocarbon group, such as cyclopentyl(meth)acrylate, cyclohexyl(meth)acrylate, and isobornyl(meth)acrylate; (meth)acrylic acid esters having an aromatic hydrocarbon group, such as phenyl(meth)acrylate; and (meth)acrylic acid esters obtained from an alcohol derived from a terpene compound, etc.

For the purpose of modifying cohesive force, heat resistance, and cross-linking property, etc., the acrylic polymer (A) may contain, if necessary, another monomer component (copolymerizable monomer) that is copolymerizable with the (meth)acrylic acid alkyl ester. Accordingly, the acrylic polymer (A) may contain a copolymerizable monomer along with the (meth)acrylic acid alkyl ester as a major component. A monomer having a polar group can be preferably used as the copolymerizable monomer.

Specific examples of the copolymerizable monomer include: carboxyl group-containing monomers, such as acrylic acid, methacrylic acid, carboxy ethyl acrylate, carboxypentyl acrylate, itaconic acid, maleic acid, fumaric acid, crotonic acid, and isocrotonic acid; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth)acrylic acid hydroxyhexyl, (meth)acrylic acid hydroxyoctyl, (meth)acrylic acid hydroxydecyl, (meth)acrylic acid hydroxylauryl, and (4-hydroxymethyl cyclohexyl)methyl methacrylate; acid anhydride group-containing monomers, such as maleic acid anhydride and itaconic acid anhydride; sulfonic acid group-containing monomers, such as styrene sulfonic acid, allyl sulfonic acid, 2-(meth)acrylamide-2-methylpropanesulfonic acid, (meth)acrylamide propanesulfonic acid, sulfopropyl(meth)acrylate, and (meth)acryloyloxy naphthalenesulfonic acid; phosphate group-containing monomers, such as 2-hydroxyethyl acryloyl phosphate; (N-substituted)amide monomers, such as N,N-dialkyl(meth) acrylamides including (meth)acrylamide, N,N-dimethyl (meth)acrylamide, N,N-diethyl(meth)acrylamide, N,N- dipropyl(meth)acrylamide, N,N-diisopropyl(meth)acrylamide, N,N-di(n-butyl)(meth)acrylamide, and N,N-di(t-butyl)(meth)acrylamide, N-ethyl(meth)acrylamide, N-isopropyl(meth)acrylamide, N-butyl(meth)acrylamide, N-n-butyl(meth)acrylamide, N-methylol(meth)acrylamide, N-ethylol(meth)acrylamide, N-methylol propane(meth)acrylamide, N-methoxymethyl(meth)acrylamide, N-methoxyethyl(meth)acrylamide, N-butoxymethyl(meth)acrylamide, and N-acryloylmorpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexylmaleimide, N-isopropylmaleimide, N-laurylmaleimide, and N-phenylmaleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide;nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinyl-2-piperidone, N-vinyl-3-morpholine, N-vinyl-2-caprolactam, N-vinyl-1,3-oxazine-2-one, N-vinyl-3,5-morpholinedione; N-vinylpyrazole, N-vinyl isoxazole, N-vinylthiazole, N-vinyl isothiazole, and N-vinylpyridazine; N-vinyl carboxylic acid amides; lactam monomers, such as N-vinyl caprolactam; cyanoacrylate monomers, such as acrylonitrile and methacrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; (meth)acrylic acid alkoxy alkyl monomers, such as (meth)acrylic acid methoxyethyl and (meth)acrylic acid ethoxyethyl; styrene monomers, such as styrene and α-methylstyrene; epoxy group-containing acrylic monomers, such as (meth)acrylic acid glycidyl; glycol acrylic ester monomers, such as (meth)acrylic acid polyethylene glycol, (meth)acrylic acid polypropylene glycol, (meth)acrylic acid methoxy ethylene glycol, and (meth)acrylic acid methoxy polypropylene glycol; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; vinyl esters, such as vinyl acetate and vinyl propionate; aromatic vinyl compounds, such as vinyl toluene and styrene; olefins or dienes, such as ethylene, butadiene, isoprene, and isobutylene; vinyl ethers, such as vinyl alkyl ether; vinyl chloride; sulfonic acid group-containing monomers, such as vinyl sulfonate sodium; imide group-containing monomers, such as cyclohexyl maleimide and isopropyl maleimide; isocyanate group-containing monomers, such as 2-isocyanate ethyl (meth)acrylate; and amide group-containing vinyl monomers, such as N-acryloylmorpholine, etc. These copolymerizable monomers can be used alone or in combination of two or more thereof.

The use amount of the copolymerizable monomer is not particularly limited, but the copolymerizable monomer can be usually contained in an amount of approximately 0.1 to approximately 40% by weight, preferably in an amount of approximately 0.5 to approximately 30% by weight, and more preferably in an amount of approximately 1 to approximately 20% by weight, based on the total weight of the monomer components for preparing the acrylic polymer (A).

By containing the copolymerizable monomer in an amount of approximately 0.1% by weight or more, a decrease in the cohesive force of the acrylic pressure-sensitive adhesive that forms the core layer 22 can be prevented, and high shear force can be obtained. Further, by making the content of the copolymerizable monomer to be approximately 40% by weight or less, it can be prevented that the cohesive force of the acrylic pressure-sensitive adhesive that forms the core layer 22 may become too high, and the tackiness at normal temperature (25° C.) can be improved.

Alternatively, a polyfunctional monomer may be contained, if necessary, in the acrylic polymer (A) in order to adjust the cohesive force of the acrylic pressure-sensitive adhesive tape.

Examples of the polyfunctional polymer include, for example: (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, 1,2-ethylene glycol di(meth)acrylate, 1,6-hexanediol di(meth)acrylate, 1,12-dodecane diol di(meth)acrylate, trimethylolpropane tri(meth)acrylate, tetramethylol methane tri(meth)acrylate, allyl(meth)acrylate, vinyl(meth)acrylate, divinylbenzene, epoxy acrylate, polyester acrylate, urethane acrylate, butyl di(meth)acrylate, and hexyl di(meth)acrylate, etc. Among them, trimethylolpropane tri(meth)acrylate, hexanediol di(meth)acrylate, and dipentaerythritol hexa(meth)acrylate can be preferably used. The polyfunctional (meth)acrylate can be used alone or in combination of two or more thereof.

The use amount of the polyfunctional monomer is changed depending on the molecular weight or the number of functional groups thereof, but the polyfunctional monomer is added in an amount of approximately 0.01 to approximately 3.0% by weight, preferably in an amount of approximately 0.02 to approximately 2.0% by weight, and more preferably in an amount of approximately 0.03 to approximately 1.0% by weight, based on the total weight of the monomer components for preparing the acrylic polymer (A).

If the use amount of the polyfunctional monomer exceeds approximately 3.0% by weight based on the total weight of the monomer components for preparing the acrylic polymer (A), for example, the cohesive force of the acrylic pressure-sensitive adhesive that forms the core layer 22 may become too high and accordingly there are sometimes the cases where the adhesive force may be decreased. On the other hand, if the use amount thereof is below 0.01% by weight, there are sometimes the cases where, for example, the cohesive force of the acrylic pressure-sensitive adhesive that forms the core layer 22 may be decreased.

(3-1-2: Polymerization Initiator)

In preparing the acrylic polymer (A), the acrylic polymer (A) can be easily formed by a curing reaction using heat or ultraviolet rays with the use of a polymerization initiator, such as a thermal polymerization initiator, photo-polymerization initiator (photo-initiator), or the like. In particular, a photo-polymerization initiator can be preferably used in terms of the advantage that a polymerization time can be shortened. The polymerization initiator can be used alone or in combination of two or more thereof.

Examples of the thermal polymerization initiator include, for example: azo polymerization initiators [for example, 2,2'-azobisisobutyronitrile, 2,2'-azobis-2-methylbutyronitrile, 2,2'-azobis(2-methylpropionic acid)dimethyl, 4,4'-azobis-4-cyanovalerianic acid, azobis isovaleronitrile, 2,2'-azobis(2- amidinopropane)dihydrochloride, 2,2'-azobis[2-(5-methyl-2-imidazoline-2-yl)propane]dihydrochloride, 2,2'-azobis(2-methylpropionamidine)disulfate, and 2,2'-azobis(N,N'-dimethyleneisobutylamidine)dihydrochloride, etc.]; peroxide polymerization initiators (e.g., dibenzoyl peroxide, t-butyl permaleate, and lauroyl peroxide, etc.); and redox polymerization initiator, etc.

The use amount of the thermal polymerization initiator is not particularly limited, and only has to be within a conventional range in which it can be used as a thermal polymerization initiator.

The photo-polymerization initiator is not particularly limited, but, for example, a benzoin ether photo-polymerization initiator, acetophenone photo-polymerization initiator, α-ketol photo-polymerization initiator, aromatic sulfonyl chloride photo-polymerization initiator, photoactive oxime photo-polymerization initiator, benzoin photo-polymerization initiator, benzyl photo-polymerization initiator, benzophenone photo-polymerization initiator, ketal photo-polymerization initiator, thioxanthone photo-polymerization initiator, acylphosphine oxide photo-polymerization initiator, or the like, can be used.

Specific examples of the benzoin ether photo-polymerization initiator include, for example: benzoin methyl ether, benzoin ethyl ether, benzoin propyl ether, benzoin isopropyl ether, benzoin isobutyl ether, 2,2-dimethoxy-1,2-diphenylethane-1-one [product name: IRGACURE 651, made by Ciba Specialty Chemical Inc.], and anisole methyl ether, etc. Specific examples of the acetophenone photo-polymerization initiator include, for example: 1-hydroxycyclohexyl phenyl ketone [product name: IRGACURE 184, made by Ciba Specialty Chemicals Inc.], 4-phenoxy dichloroacetophenone, 4-t-butyl-dichloroacetophenone, 1-[4-(2-hydroxyethoxy)-phenyl]-2-hydroxy-2-methyl-1-propane-1-one [product name: IRGACURE 2959, made by Ciba Specialty Chemicals Inc.], 2-hydroxy-2-methyl-1-phenyl-propane-1-one [product name: DAROCUR 1173, made by Ciba Specialty Chemicals Inc.], and methoxy acetophenone, etc. Specific examples of the α-ketol photo-polymerization initiator include, for example: 2-methyl-2-hydroxy propiophenone and 1-[4-(2-hydroxyethyl)-phenyl]-2-hydroxy-2-methylpropane-1-one, etc. Specific examples of the aromatic sulfonyl chloride photo-polymerization initiator include, for example, 2-naphthalene sulfonyl chloride, etc. Specific examples of the photoactive oxime photo-polymerization initiator include, for example, 1-phenyl-1,1-propanedione-2-(o-ethoxycarbonyl)-oxime, etc.

Specific examples of the benzoin photo-polymerization initiator include, for example, benzoin, etc. Specific examples of the benzyl photo-polymerization initiator include, for example, benzyl, etc. Specific examples of the benzophenone photo-polymerization initiators include, for example, benzophenone, benzoylbenzoic acid, 3,3'-dimethyl-4-methoxybenzophenone, polyvinyl benzophenone, and α-hydroxy cyclohexyl phenyl ketone, etc. Specific examples of the ketal photo-polymerization initiator include, for example, benzyl dimethyl ketal, etc. Specific examples of the thioxanthone photo-polymerization initiator include, for example, thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, isopropyl thioxanthone, 2,4-diisopropyl thioxanthone, and dodecyl thioxanthone, etc.

Examples of the acylphosphine photo-polymerization initiator include, for example: bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butyl phosphine oxide, bis(2,6-dimethoxybenzoyl)-(2-methylpropane-1-yl)phosphine oxide, bis(2,6-dimethoxybenzoyl)-(1-methylpropane-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl)phosphine oxide, bis(2,6-diethoxybenzoyl)(1-methylpropane-1-yl) phosphine oxide, bis(2,6-dibutoxybenzoyl)(2-methylpropane-1-yl)phosphine oxide, bis(2,4-dimethoxybenzoyl)(2-methypropane-1-yl)phosphine oxide, bis(2,4,6-trimethylbenzoyl)(2,4-dipentoxyphenyl)phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl) -2,3,5,6-tetramethylphenylphosphine oxide, bis(2,4,6-trimethyl benzoyl)-2,4-di-n-butoxy phenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, and tri(2-methylbenzoyl)phosphine oxide, etc.

The use amount of the photo-polymerization initiator is not particularly limited, but the photo-polymerization initiator is combined in an amount within a range of, for example, approximately 0.01 to approximately 5 parts by weight, and preferably in an amount within a range of approximately 0.05 to approximately 3 parts by weight, based on 100 parts by weight of the monomer components for preparing the acrylic polymer (A).

If the use amount of the photo-polymerization initiator is below 0.01 parts by weight, there are sometimes the cases where a polymerization reaction becomes insufficient. If the use amount thereof exceeds 5 parts by weight, because the photo-polymerization initiator absorbs an ultraviolet ray, an ultraviolet ray does not reach the inside of the pressure-sensitive adhesive layer, thereby causing a decrease in the polymerization ratio or the molecular weight of the generated polymer to be small. Thereby, the cohesive force of the pressure-sensitive adhesive layer to be formed becomes small, and hence there are sometimes the cases where, when the pressure-sensitive adhesive layer is released from a film, part of the pressure-sensitive adhesive layer remains on the film and accordingly the film cannot be reused. The photo-polymerization initiator can be used alone or in combination of two or more thereof.

Besides the aforementioned polyfunctional monomers, a cross-linking agent can also be used for adjusting the cohesive force. Commonly-used cross-linking agents can be used as the cross-linking agent. Examples of the cross-linking agents include, for example: epoxy cross-linking agent, isocyanate cross-linking agent, silicone cross-linking agent, oxazoline cross-linking agent, aziridine cross-linking agent, silane cross-linking agent, alkyl-etherified melamine cross-linking agent, and metal chelate cross-linking agent, etc. Among them, in particular, the isocyanate cross-linking agent and epoxy cross-linking agent can be preferably used.

Specific examples of the isocyanate cross-linking agent include: tolylenediisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenylmethane triisocyanate, polymethylene polyphenyl isocyanate, and these adducts with polyols, such as trimethylolpropane.

Examples of the epoxy cross-linking agent include: bisphenol A, epichlorohydrin type epoxy resin, ethyleneglycidylether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, and 1,3-bis(N,N'-diamine glycidyl aminomethyl)cyclohexane, etc.

In the present embodiment, the acrylic polymer (A) can also be prepared as a partial polymer (acrylic polymer syrup) that can be obtained by radiating ultraviolet (UV) rays onto a mixture in which the aforementioned monomer components and the polymerization initiator have been combined, so that part of the monomer components are polymerized. The weight average molecular weight (Mw) of the acrylic polymer (A) is, for example, within a range of 30000 to 5000000.

(3-1-3: Fine Particle)

In the present embodiment, fine particles can be added to the acrylic polymer (A) that forms the core layer. The fine particle has operational effects of improving the shear adhesive force and processability of the acrylic pressure-sensitive adhesive tape or sheet made of the acrylic pressure-sensitive adhesive.

Examples of the fine particle include: metallic particles, such as copper, nickel, aluminum, chromium, iron, and stainless steel, and metal oxide particles thereof; carbide particles, such as silicon carbide, boron carbide, and carbon nitride, and nitride particles, such as aluminum nitride, silicon nitride, and boron nitride; ceramic particles represented by oxides, such as glass, alumina, and zirconium; inorganic fine particles, such as calcium carbide, aluminum hydroxide, glass, and silica; natural material particles, such as volcanic Shirasu and sand; polymer particles of polystyrene, polymethylmethacrylate, phenol resin, benzoguanamine resin, urea resin, silicone resin, nylon, polyester, polyurethane, polyethylene, polypropylene, polyamide, and polyimide, etc.; organic hollow bodies of vinylidene chloride and acrylic, etc.; and organic spheres, such as nylon bead, acrylic bead, and silicone bead.

Hollow fine particles can be preferably used as the fine particle. Among the hollow fine particles, hollow inorganic fine particles can be preferably used from the viewpoint of the efficiency of the polymerization using an ultraviolet reaction and weight. Examples of the hollow inorganic fine particles include: glass balloons, such as hollow glass balloons (also referred to as hollow glass microspheres); hollow balloons made of a metallic compound, such as hollow alumina balloons; and hollow balloons made of porcelain, such as hollow ceramic balloons. High-temperature adhesive force can be improved by using the aforementioned hollow glass balloons, without impairing other properties, such as shear force and holding force.

Examples of the hollow glass balloons (hollow glass microspheres) include, for example, ones with a product name of "Glass Microballoon" (made by FUJI SILYSIA CHEMICAL LTD.); with product names of "CEL-STAR Z-20", "CEL-STAR Z-27", "CEL-STAR CZ-31T", "CEL-STAR Z-36", "CEL-STAR Z-39", "CEL-STAR T-36", and "CEL-STARPZ-6000" (each of them is made by Tokai Kogyo Co., Ltd.); and with a product name of "SILUX*FINE BALLOON" (made by FINE-BALLOON Ltd.), etc.

The size of the fine particle (average particle size) is not particularly limited, but can be selected from a range of, for example, 1 to 500 μm, preferably from a range of 5 to 200 μm, and more preferably from a range of 10 to 150 μm.

The specific gravity of the fine particle is not particularly limited, but can be selected from a range of, for example, 0.1 to 1.8 g/cm$^3$, preferably from a range of 0.2 to 1.5 g/cm$^3$, and more preferably from a range of 0.2 to 0.5 g/cm$^3$.

If the specific gravity of the fine particle is smaller than 0.1 g/cm$^3$, floating of the fine particles becomes large when combining and mixing the fine particles into the acrylic pressure-sensitive adhesive, and accordingly there are sometimes the cases where it is difficult to uniformly scatter the fine particles. In addition, because the strength of the glass becomes low, it will easily crack. Conversely, if the specific gravity thereof is larger than 1.8 g/cm$^3$, the transmission rate of an ultraviolet ray is decreased, and accordingly there is the fear that the efficiency of the ultraviolet reaction may be decreased. In addition, because the weight of the acrylic pressure-sensitive adhesive becomes large, the workability becomes poor.

The use amount of the fine particle is not particularly limited. If the use amount thereof is below, for example, 10% by volume based on the whole volume of the core layer, the effect of the addition of the fine particles is low. On the other hand, if the use amount thereof exceeds 50% by volume, the adhesive force is decreased.

(3-1-4: Bubble)

In the present embodiment, bubbles can be added to the acrylic polymer (A) that forms the core layer. By containing the bubbles in the core layer, the acrylic pressure-sensitive adhesive (acrylic pressure-sensitive adhesive tape) can exhibit good adhesiveness to a curved surface and concave-convex surface, and also exhibit good resistance to resilience.

It is desirable that the bubbles contained in the core layer are basically closed-cell type bubbles, but closed-cell type bubbles and interconnected-cell type bubbles may coexist.

Although the bubble usually has a spherical shape (in particular, a true spherical shape), the shape does not necessarily have to have a true spherical shape and accordingly there may be concavities and convexities on the sphere. The average bubble size (diameter) of the bubble is not particularly limited, but can be selected from a range of, for example, 1 to 1000 μm, preferably from a range of 10 to 500 μm, and more preferably from a range of 30 to 300 μm.

A gas component contained in the bubble (gas component that forms the bubble; sometimes referred to as a "bubble-forming gas") is not particularly limited, but various gas components, such as inactive gases including nitrogen, carbon dioxide, and argon, and air, etc., can be used. When a polymerization reaction is performed in a state where a gas that forms the bubbles is contained, it is important that the gas that forms the bubbles does not hamper the reaction. Nitrogen can be preferably used as the gas that forms the bubbles, from the viewpoint of not inhibiting a polymerization reaction and cost.

The amount of the bubbles contained in the core layer is not particularly limited, but can be appropriately selected in accordance with the use purpose thereof. For example, the use amount thereof is within a range of 5 to 50% by volume based on the whole volume of the core layer containing the bubbles, and preferably within a range of 8 to 40% by volume. If the mixing amount thereof is below 5% by volume, the effect of mixing the bubbles cannot be obtained. Conversely, if the mixing amount thereof exceeds 50% by volume, some of the bubbles penetrate the core layer, and accordingly the adhesive performance and the appearance are decreased.

In the core layer containing the bubble, the form in which the bubbles are formed is not particularly limited. The core layer containing the bubbles can be formed, for example, in the following ways: (1) the core layer in which the bubbles are formed can be formed by using a core layer in which a gas component that will form the bubbles (bubble-forming gas) has been mixed in advance; and (2) the core layer in which the bubbles are formed can be formed by mixing a foaming agent into the core layer. When the latter way (2) is used, the foaming agent is not particularly limited, but can be appropriately selected from, for example, publicly-known foaming agents. For example, heat-expandable microspheres can be used as the foaming agent.

<Other Components>

Besides the aforementioned components, a thickener, a thixotropic agent, and fillers, etc., may be added to the core layer, if necessary. Examples of the thickener include acrylic rubber, epichlorohydrin rubber, and butyl rubber, etc. Examples of the thixotropic agent include colloid silica and polyvinylpyrrolidone, etc. Examples of the fillers include calcium carbonate, titanium oxide, and clay, etc. Other than those, a plasticizer, anti-aging agent, antioxidant, etc., may be appropriately added. Additives to be added should not be limited thereto.

In the present embodiment, the pressure-sensitive adhesive layer may have a multilayer structure in which two or more pressure-sensitive adhesive layers are laminated, other than a single-layer structure. Specifically, the pressure-sensitive adhesive layer may be formed only of the aforementioned core layer, or be a pressure-sensitive adhesive layer having a multilayer structure in which another pressure-sensitive adhesive layer (surface layer) has been laminated on at least one of the surfaces of the core layer.

When the pressure-sensitive adhesive layer has a multilayer structure, it is preferable that the pressure-sensitive adhesive layer is formed of each pressure-sensitive adhesive layer having a composition different from others.

(Surface Layer)

It is preferable that the surface layer 24 contains, as its components, an acrylic polymer (A) as a pressure-sensitive adhesive composition and a (meth)acrylic polymer (B) having a weight average molecular weight of 1000 or more and smaller than 3000 as a tackifies resin. The acrylic polymer (A) used in the surface layer 24 can be selected from the compounds (various monomer components) exemplified as the acrylic polymer (A) of the core layer 22. The components and composition ratio of the acrylic polymer (A) used in the surface layer 24 may or may not be similar to those of the acrylic polymer (A) of the core layer 22. The acrylic polymer (A) can be prepared by using the same polymerization initiator and same polymerization method as those in the acrylic polymer (A) that forms the core layer. Hereinafter, the (meth) acrylic polymer will be described in detail.

[(Meth)Acrylic Polymer (B)]

The (meth)acrylic polymer (B) is one having a weight average molecular weight smaller than that of the acrylic polymer (A), and serves as a tackifier resin and has the advantage that polymerization inhibition is hardly caused in the UV polymerization.

By combining the (meth)acrylic polymer (B) into the pressure-sensitive adhesive composition that forms the surface layer, the adhesiveness of the acrylic pressure-sensitive adhesive tape to an adherend having low polarity made of polyethylene, polypropylene, or the like, can be remarkably improved. The (meth)acrylic polymer (B) contains, for example, a (meth)acrylic acid ester as a monomeric unit.

Examples of such a (meth)acrylic acid ester include: (meth)acrylic acid alkyl esters, such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid-2-ethylhexyl, (meth)acrylic acid heptyl, (meth)acrylic acid octyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, and (meth)acrylic acid dodecyl; esters of (meth)acrylic acids with alicyclic alcohols, such as cyclohexyl(meth)acrylate and (meth)acrylic acid isobornyl; (meth)acrylic acid aryl esters, such as (meth)acrylic acid phenyl and (meth)acrylic acid benzyl; and (meth)acrylic acid esters obtained from alcohol derived from a terpene compound. These (meth)acrylic acid esters can be used alone or in combination.

The (meth)acrylic polymer (B) can also be obtained by copolymerizing, other than the aforementioned (meth)acrylic acid ester component units, another monomer component (copolymerizable monomer) that is copolymerizable with the (meth)acrylic acid ester.

Examples of the another monomer that is copolymerizable with the (meth)acrylic acid ester include: (meth)acrylic acid alkoxyalkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; salts, such as (meth)acrylic acid alkali metal salt; di(meth)acrylic acid ester monomers of (poly) alkylene glycols, such as di(meth)acrylic acid ester of ethylene glycol, di(meth)acrylic acid ester of diethylene glycol, di(meth)acrylic acid ester of triethylene glycol, di(meth) acrylic acid ester of polyethylene glycol, di(meth)acrylic acid ester of propylene glycol, di(meth)acrylic acid ester of dipropylene glycol, and di(meth)acrylic acid ester of tripropylene glycol; poly(meth)acrylic acid ester monomers, such as trimethylolpropane tri(meth)acrylic acid ester; vinyl esters, such as vinyl acetate and vinyl propionate; halogenated vinyl compounds, such as vinylidene chloride, (meth)acrylic acid-2-chloroethyl; oxazoline group-containing polymerizable compounds, such as 2-vinyl-2-oxazoline, 2-vinyl-5-methyl-2-oxazoline, and 2-isopropenyl-2-oxazoline; aziridine group-containing polymerizable compounds, such as (meth)acryloylaziridine and (meth)acrylic acid-2-aziridinylethyl; epoxy group-containing vinyl monomers, such as allyl glycidyl ether, (meth)acrylic acid glycidyl ether and (meth)acrylic acid-2-ethyl glycidyl ether; hydroxyl group-containing vinyl monomers, such as (meth)acrylic acid-2-hydroxyethyl, (meth)acrylic acid-2-hydroxypropyl, monoesters of (meth)acrylic acids with polypropylene glycol or polyethylene glycol, and adducts of lactones with (meth) acrylic acid-2-hydroxyethyl; fluorine-containing vinyl monomers, such as fluorine-substituted (meth)acrylic acid alkyl ester; acid anhydride group-containing monomers, such as maleic acid anhydride and itaconic acid anhydride; aromatic vinyl compound monomers, such as styrene, α-methylstyrene, and vinyl toluene;; reactive halogen-containing vinyl monomers, such as 2-chloroethyl vinyl ether and monochloro vinyl acetate; amide group-containing vinyl monomers, such as (meth)acrylamide, N-isopropyl(meth)acrylamide, N-butyl(meth)acrylamide, N,N-diethyl(meth)acrylamide, N,N-dimethyl(meth)acrylamide, N-methylol(meth)acrylamide, N-ethylol(meth)acrylamide, N-methylolpropane(meth)acrylamide, N-methoxyethyl (meth)acrylamide, N-butoxymethyl(meth)acrylamide, and N-acryloyl morpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexylmaleimide, N-isopropylmaleimide, N-laurylmaleimide, and N-phenylmaleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinylpyrazole, N-vinyl isoxazole, N-vinylthiazole, N-vinyl isothiazole, and N-vinylpyridazine; N-vinyl carboxylic acid amides; lactam monomers, such as N-vinyl caprolactam; cyanoacrylate monomers, such as (meth)acrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; imide group-containing monomers, such as cyclohexyl maleimide and isopropyl maleimide; isocyanate group-containing monomers, such as 2-isocyanate ethyl(meth)acrylate; organic silicon-containing vinyl monomers, such as vinyltrimethoxysilane, γ-methacryloxpropyl trimethoxy silane, allyltrimethoxysilane, trimethoxysilylpropylallylamine, and 2-methoxy ethoxy trimethoxy silane; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth)acrylic acid hydroxyhexyl, (meth)acrylic acid hydroxyoctyl, (meth)acrylic acid hydroxydecyl, (meth)acrylic acid hydroxylauryl, and (4-hydroxymethyl cyclohexyl)methyl methacrylate; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; olefins or dienes, such as ethylene, butadiene, isoprene, and isobutylene; vinyl ethers, such as vinyl alkyl ether; vinyl chloride; and macro-monomers having a radically polymerizable vinyl group at the monomer end to which a vinyl group has been polymerized. These monomers can be polymerized, alone or in combination, with the aforementioned (meth) acrylic acid ester.

In the acrylic pressure-sensitive adhesive composition according to the present embodiment, examples of the (meth) acrylic polymer (B) include, for example, copolymer of cyclohexyl methacrylate (CHMA) and isobutyl methacrylate (IBMA), that of cyclohexyl methacrylate (CHMA) and isobornyl methacrylate (IBXMA), that of cyclohexyl methacrylate (CHMA) and acryloyl morpholine (ACMO), that of cyclohexyl methacrylate (CHMA) and diethylacrylamide (DEAA), that of dicyclopentanyl methacrylate (DCPMA) and isobornyl methacrylate (IBXMA), homopolymer of dicyclopentanyl methacrylate (DCPMA), that of cyclohexyl methacrylate (CHMA), that of isobornyl methacrylate (IBXMA), that of isobornyl acrylate (IBXA), that of dicyclopentanyl acrylate (DCPA), that of 1-adamantyl methacrylate (ADMA), and that of 1-adamantyl acrylate (ADA), etc.

It is preferable that the (meth)acrylic polymer (B) contains, as a monomer unit, an acrylic monomer having a relatively bulky structure, represented by: (meth)acrylate whose alkyl group has a branched structure, such as t-butyl(meth)acrylate; ester of (meth)acrylic acid with alicyclic alcohol, such as cyclohexyl(meth)acrylate and (meth)acrylic acid isobornyl; and (meth)acrylate having a cyclic structure, such as (meth)acrylic acid aryl ester including (meth)acrylic acid phenyl and (meth)acrylic acid benzyl. By making the acrylic polymer (B) have such a bulky structure, the adhesiveness of the acrylic pressure-sensitive adhesive tape can be further improved. A monomer having a cyclic structure has a large effect in terms of bulkiness, and a monomer containing multiple rings has a larger effect. In addition, when UV polymerization is adopted in synthesizing the (meth)acrylic polymer (B) or in producing the pressure-sensitive adhesive composition, it is preferable to use a monomer having a saturated bond, in terms that polymerization inhibition is hardly caused. In that case, (meth)acrylate whose alkyl group has a branched structure, or an ester thereof with an alicyclic alcohol can be preferably used a monomer that forms the (meth) acrylic polymer (B).

The (meth)acrylic polymer (B) may further contain, as a monomer unit, a (meth)acrylic monomer having an alicyclic structure containing three or more rings. By making the (meth) acrylic polymer (B) have a bulky structure, such as an alicyclic structure containing three or more rings, the adhesiveness of the acrylic pressure-sensitive adhesive tape can be more improved. In particular, the adhesiveness to an adherend having low polarity made of polyethylene, polypropylene, or the like, can be remarkably improved. The (meth)acrylic polymer (B) may be a homopolymer of a (meth)acrylic monomer having an alicyclic structure containing three or more rings, or a copolymer of a (meth)acrylic monomer having an alicyclic structure containing three or more rings with the aforementioned (meth)acrylic acid ester monomer or copolymerizable monomer.

A (meth)acrylic monomer is a (meth)acrylic acid ester represented by, for example, the following general formula (1):

[wherein, $R^4$ represents a hydrogen atom or a methyl group and $R^5$ an alicyclic hydrocarbon group having an alicyclic structure containing three or more rings.]

It is preferable that the alicyclic hydrocarbon group has a three-dimensional structure, such as a bridged ring structure. By making the (meth)acrylic polymer (B) have an alicyclic structure containing three or more rings and having a bridged ring structure, as stated above, the adhesiveness of the acrylic pressure-sensitive adhesive tape can be more improved. In particular, the adhesiveness to an adherend having low polarity made of polyethylene and polypropylene, etc., can be improved more remarkably. Further, the resistance property to resilience and holding property can be both achieved. That is, by making the (meth)acrylic polymer (B) have an alicyclic structure containing three or more rings and having abridged ring structure, an acrylic pressure-sensitive adhesive tape provided with pressure-sensitive adhesive force, resistance property to resilience, and holding property at high dimension, can be obtained. Examples of the alicyclic hydrocarbon group having a bridged ring structure include, for example: a dicyclopentanyl group represented by the following formula (2a);

a dicyclopentenyl group represented by the following formula (2b); an adamantyl group represented by the following formula (2c); a tricyclopentanyl group represented by the following formula (2d); and a tricyclopentenyl group represented by the following formula (2e), etc. When UV polymerization is adopted in synthesizing the (meth)acrylic polymer (B) or in producing the pressure-sensitive adhesive composition, in particular, a (meth)acrylic monomer having a saturated structure, such as a dicyclopentanyl group represented by the following formula (2a), an adamnatyl group represented by the following formula (2c), a tricyclopentanyl group represented by the following formula (2d), or the like, among the (meth)acrylic monomers having an alicyclic structure containing three or more rings and having a bridged ring structure, can be preferably used as the monomer that forms the (meth)acrylic polymer (B), in terms that polymerization inhibition is hardly caused.

[Formula 1]

(2a)

(2b)

(2c)

(2d)

(2e)

Examples of such a (meth)acrylic monomer having an alicyclic structure containing three or more rings and having a bridged ring structure include (meth)acrylic acid esters, such as dicyclopentanyl methacrylate, dicyclopentanyl acrylate, dicyclopentanyl oxyethyl methacrylate, dicyclopentanyl oxyethyl acrylate, tricyclopentanyl methacrylate, tricyclopentanyl acrylate, 1-adamantyl methacrylate, 1-adamantyl acrylate, 2-methyl-2-adamantyl methacrylate, 2-methyl-2-adamantyl acrylate, 2-ethyl-2-adamantyl methacrylate, and 2-ethyl-2-adamantyl acrylate. This (meth)acrylic monomer can be used alone or in combination of two or more thereof.

A functional group reactive with an epoxy group or an isocyanate group may be further introduced into the (meth)acrylic polymer (B). Examples of such a functional group include a hydroxyl group, carboxyl group, amino group, amide group, and a mercapto group. When the (meth)acrylic polymer (B) is produced, it is preferable to use a monomer having such a functional group.

The weight average molecular weight of the (meth)acrylic polymer (B) is 1000 or more and smaller than 30000, preferably 1500 or more and smaller than 20000, and more preferably 2000 or more and smaller than 10000. If the molecular weight is 30000 or more, there are sometimes the cases where the effect of improving the pressure-sensitive adhesive force of a pressure-sensitive adhesive tape cannot be sufficiently obtained. Conversely, if the molecular weight is smaller than 1000, there are sometimes the cases where, because the molecular weight is too small, the pressure-sensitive adhesive force or holding property is decreased.

The weight average molecular weight can be determined by a GPC method in terms of polystyrene. Specifically, the weight average molecular weight can be measured by using HPLC8020 and two TSKgel GMH-Hs(20) as columns, which are made by Tosoh Corporation, and under conditions in which a tetrahydrofuran solvent is used and a flow rate is approximately 0.5 ml/min.

The content of the (meth)acrylic polymer (B) is preferably within a range of 2 to 70 parts by weight, and more preferably within a range of 5 to 50 parts by weight, based on 100 parts by weight of the acrylic polymer (A). If the (meth)acrylic polymer (B) is added in an amount exceeding 70 parts by weight, the elastic modulus of a pressure-sensitive adhesive layer formed of the acrylic pressure-sensitive adhesive composition according to the present embodiment becomes large, and hence there are sometimes the cases where the adhesiveness at a low-temperature is deteriorated or the pressure-sensitive adhesive force is not exerted even at room temperature. Conversely, if the addition amount thereof is smaller than 2 parts by weight, there are sometimes the cases where the effect of adding the (meth)acrylic polymer (B) cannot be obtained.

The glass transition temperature (Tg) of the (meth)acrylic polymer (B) is within a range of approximately 20° C. or higher and 300° C. or lower, preferably within a range of approximately 30° C. or higher and 300° C. or lower, and more preferably within a range of approximately 40° C. or higher and 300° C. or lower. If the glass transition temperature (Tg) is lower than approximately 20° C., the cohesive force of the pressure-sensitive adhesive layer at a temperature higher than or equal to room temperature is decreased, and hence there are sometimes the cases where the holding property or the adhesiveness at a high-temperature is decreased. The glass transition temperatures of typical materials that can be used as the (meth)acrylic polymer (B) in the present embodiment are shown in Table 1. The glass transition temperatures shown there are nominal values described in documents or catalogs, etc., or values calculated based on the following Equation (3) (Fox Equation):

$$1/Tg = W1/Tg1 + W2/Tg2 + \cdots + Wn/Tgn \qquad (3)$$

[wherein, Tg represents the glass transition temperature of the (meth)acrylic polymer (B) (unit: K), Tgi (i=1, 2, *, n) represents the glass transition temperature of a homopolymer that has been formed of a monomer i (unit: K), and Wi (i=1, 2, *, n) represents the weight fraction of the monomer i in the whole monomer components]. The above equation (3) is adopted when the (meth)acrylic polymer (B) is formed of n types of monomer components of monomer 1, monomer 2, ***, monomer n.

TABLE 1

| COMPOSITION OF (METH)ACRYLIC POLYMER (B) | Tg(° C.) | REMARKS |
|---|---|---|
| DCPMA | 175 | VALUE DESCRIBED IN DOCUMENTS, ETC. |
| DCPA | 120 | VALUE DESCRIBED IN DOCUMENTS, ETC. |
| IBXMA | 173 | VALUE DESCRIBED IN DOCUMENTS, ETC. |
| IBXA | 97 | VALUE DESCRIBED IN DOCUMENTS, ETC. |
| CHMA | 66 | VALUE DESCRIBED IN DOCUMENTS, ETC. |
| MMA | 105 | VALUE DESCRIBED IN DOCUMENTS, ETC. |
| ADMA | 250 | VALUE DESCRIBED IN DOCUMENTS, ETC. |
| ADA | 153 | VALUE DESCRIBED IN DOCUMENTS, ETC. |
| DCPMA/IBXMA40 | 174 | CALCULATED VALUE (BASED ON Fox EQUATION) |
| DCPMA/MMA40 | 144 | CALCULATED VALUE (BASED ON Fox EQUATION) |
| DCPMA/MMA60 | 130 | CALCULATED VALUE (BASED ON Fox EQUATION) |
| IBXMA/MMA60 | 130 | CALCULATED VALUE (BASED ON Fox EQUATION) |
| ADMA/MMA40 | 180 | CALCULATED VALUE (BASED ON Fox EQUATION) |
| ADA/MMA40 | 132 | CALCULATED VALUE (BASED ON Fox EQUATION) |
| CHMA/IBMA40 | 51 | CALCULATED VALUE (BASED ON Fox EQUATION) |

The abbreviations in Table 1 represent the following compounds.

DCPMA: Dicyclopentanyl Methacrylate
DCPA: Dicyclopentanyl Acrylate
IBXMA: Isobornyl Methacrylate
IBXA: Isobornyl Acrylate
CHMA: Cyclohexyl methacrylate
MMA: Methyl Methacrylate
ADMA: 1-Adamantyl Methacrylate
ADA: 1-Adamantyl Acrylate
DCPMA/IBXMA 40: Copolymer of DCPMA 60 Parts by Weight and IBXMA 40 Parts by Weight
DCPMA/MMA 40: Copolymer of DCPMA 60 Parts by Weight and MMA 40 Parts by Weight
DCPMA/MMA 60: Copolymer of DCPMA 40 Parts by Weight and MMA60 Parts by Weight
IBXMA/MMA 60: Copolymer of IBXMA 40 Parts by Weight and MMA 60 Parts by Weight
ADMA/MMA 40: Copolymer of ADMA 60 Parts by Weight and MMA 40 Parts by Weight
ADA/MMA40: Copolymer of ADA 60 Parts by Weight and MMA 40 Parts by Weight
CHMA/IBMA 40: Copolymer of CHMA 60 Parts by Weight and IBMA 40 Parts by Weight (Method of Producing (Meth)Acrylic Polymer (B))

The (meth)acrylic polymer (B) can be produced by subjecting (meth)acrylic monomers each having, for example, the aforementioned structure to polymerization with the use of a solution polymerization method, bulk polymerization method, emulsion polymerization method, suspension polymerization method, and block polymerization method, etc.

(Method of Adjusting Molecular Weight of (Meth)Acrylic Polymer (B))

In order to adjust the molecular weight of the (meth)acrylic polymer (B), a chain transfer agent can be used while the polymer (B) is being polymerized. Examples of the chain transfer agent to be used include: compounds having a mercapt group, such as octylmercaptan, t-nonyl mercaptan, dodecyl mercaptan, t-dodecyl mercaptan, mercaptoethanol, and α-thioglycerol; thioglycolic acid, methyl thioglycolate, ethyl thioglycolate, propyl thioglycolate, butyl thioglycolate, t-butyl thioglycolate, 2-ethylhexyl thioglycolate, octyl thioglycolate, decyl thioglycolate, dodecyl thioglycolate, thioglycolic acid ester of ethylene glycol, thioglycolic acid ester of neopentyl glycol, and thioglycolic acid ester of pentaerythritol. Examples of the chain transfer agents, which are particularly preferable from the viewpoint of metallic corrosion property, include a-thio glycerol, mercaptoethanol, methyl thioglycolate, ethyl thioglycolate, propyl thioglycolate, butyl thioglycolate, t-butyl thioglycolate, 2-ethylhexyl thioglycolate, octyl thioglycolate, and isooctyl thioglycolate.

The use amount of the chain transfer agent is not particularly limited, but the chain transfer agent is usually contained in an amount of approximately 0.1 to approximately 20 parts by weight, preferably in an amount of approximately 0.2 to approximately 15 parts by weight, and more preferably in an amount of approximately 0.3 to approximately 10 parts by weight, based on 100 parts by weight of the (meth)acrylic polymer (B). By adjusting the addition amount of the chain transfer agent in such a way, a (meth)acrylic polymer (B) having a preferred molecular weight can be obtained. The chain transfer agent can be used alone or in combination of two or more thereof.

The weight average molecular weight of the acrylic polymer (A) or the (meth)acrylic polymer (B) can be determined by a GPC method in terms of polystyrene. Specifically, the weight average molecular weight can be determined by using HPLC8020 and two TSKgel GMH-Hs(20) as columns, which are made by Tosoh Corporation, and under conditions in which a tetrahydrofuran solvent is used and a flow rate is approximately 0.5 ml/min.

(Thickness of Pressure-Sensitive Adhesive Layer)

In the present embodiment, the thickness of the pressure-sensitive adhesive layer (when the core layer and the surface layer are present, the whole thickness) is within a range of 0.2 to 2.0 mm, and preferably within a range of 0.6 to 2.0 mm.

(Thickness Ratio)

The ratio of the thickness of the surface layer 24a (or surface layer 24b) to the total thickness of the core layer 22 and the surface layer 24a (or surface layer 24b) is preferably within a range of approximately 3 to approximately 70%. If the ratio is smaller than approximately 3%, there are sometimes the cases where desired adhesiveness cannot be obtained. Conversely, if the ratio is larger than 70%, the effects that can be expected in the case where a tape has the core layer 22 containing bubbles, such as the stress relaxation property and level difference absorption property as a pressure-sensitive adhesive tape, cannot be obtained.

(Multilayering Method)

A method of layering the core layer 22 and the surface layer 24 is not particularly limited, but, for example, the method described below can be adopted.

(1) A multilayering method in which, after the core layer 22 and the surface layer 24 are separately have been cured, the surface layer 24a is laminated on one of the surfaces of the core layer 22 and the surface layer 24b is laminated on the other surface thereof: This method has the advantage that each layer can be formed to have an accurate thickness.

(2) A method in which, after the core layer 22 is applied on the surface layer 24a (or surface layer 24b) that has been cured in advance, the core layer 22 is cured, and subsequently, after the surface layer 24b (or surface layer 24a) has been applied on the core layer 22, the surface layer 24b (or surface layer 24a) is cured, or a method in which the surface layer 24a has been applied on one of the surfaces of the core layer 22 that has been cured in advance (or the surface layer 24b has been applied on the other surface thereof), the surface layer 24a (or surface layer 24b) is cured, and subsequently, after the surface layer 24b has been applied on the other surface of the core layer 22 (or the surface layer 24a has been applied on the one of the surfaces thereof), the surface layer 24b (or surface layer 24a) is cured: In this method, because one layer is applied on another layer that has been cured, each layer can be formed to have an accurate thickness. Further, because one layer is collectively applied onto another layer that has been cured, the production process can be simplified and the production time can be shortened.

(3) A method in which the core layer 22 (or surface layer 24) is sequentially or simultaneously applied on the applied surface layer 24 (or core layer 22) and cured: In this method, both the surface layer 24 and the core layer 22 can be collectively applied.

Each layer may be formed by using a coating roll, such as a roll coater, comma coater, or the like, or a slot die. In particular, in the aforementioned method (3), a multilayer slot die for applying each layer may be used.

According to the aforementioned acrylic pressure-sensitive adhesive tape, the adhesive force to an adherend having low polarity made of polypropylene (PP), polyvinyl chloride (PVC), ethylene-propylene-diene rubber (EPDM), polystyrene, ABS, polycarbonate, or the like, can be improved by providing a multiplayer structure in which both a surface layer containing the acrylic polymer (A) and the (meth) acrylic polymer (B) and a core layer are laminated one on another.

Although the surface layers are provided respectively on both sides of the core layer in an acrylic pressure-sensitive adhesive tape according to the aforementioned embodiment, the surface layer may be provided on one side of the core layer.

(3-2: Release Liner)

A release liner according to the present embodiment has a layer structure having at least 2 layers, in which a surface layer as a release layer is provided on at least one side of a base layer. Alternatively, the release layer may be provided directly on the surface of the base layer or be laminated thereon via another layer, such as an adhesive layer.

(3-2-1: Surface Layer)

It is preferable that a first release layer of the release liner 18 according to the present embodiment, the first release layer being a surface layer provided on the side of the liner 18 that is in contact with the pressure-sensitive adhesive layer 16, is formed of low density polyethylene and an olefin elastomer that are major components. The total amount of the low density polyethylene and olefin elastomer is preferably 60% by weight or more, and more preferably 90% by weight or more, based on the whole amount of the surface layer. With such a polymer configuration, the release property is improved.

The "low density polyethylene (LDPE)" in the present embodiment means a polyethylene whose density according to JIS K 6922-2 is within a range of 900 (kg/m$^3$) or more and smaller than 930 (kg/m$^3$). The "low density polyethylene" in the embodiment includes: so-called "low density polyethylene" and "very low density polyethylene" each having a long chain branching, which can be obtained by subjecting ethylene monomers to high-pressure polymerization; and"linear low density polyethylene (LLDPE)" (the number of the carbons in a short chain branching is preferably 1 to 6) obtained by subjecting ethylene and α-olefin monomers having 3 to 8 carbons to low-pressure polymerization. Among them, the linear low density polyethylene (LLDPE) is particularly preferable, from the viewpoint that physical properties, such as release property, can be easily controlled by the copolymerization of α-olefins. In the aforementioned LLDPE, 1-hexene or 1-octene is preferable as the comonomer component to be used along with ethylene.

The aforementioned olefin elastomer is α-olefin or a copolymer containing α-olefin, and is not particularly limited, as far as the olefin elastomer is a compound exhibiting an elastomeric property. Examples of the olefin elastomer include, for example: an ethylene-α-olefin copolymer, propylene-α-olefin copolymer, ethylene-propylene-diene copolymer, ethylene-vinylacetate copolymer, polybutene, polyisobutylene, and chlorinated polyethylene, etc.

Among them, an ethylene-α-olefin copolymer elastomer is particularly preferable from the viewpoint of release property and compatibility. In the present embodiment, an ethylene-α-olefin copolymer whose density according to JIS K 6922-2 is smaller than 900 (kg/m) (e.g., 860 (kg/m$^3$) or more and smaller than 900 (kg/m)) is to be included in the olefin elastomer. An a-olefin component in the ethylene-α-olefin copolymer elastomer is not particularly limited, but α-olefin having approximately 3 to 10 carbons, such as propylene, butene, or the like, is preferable and at least one type of α-olefin (comonomer) selected from the group consisting of propylene, butene-1, hexene-1, 4-methylpentene-1, and octene-1 can be used.

Commercially-available low density polyethylenes and olefin elastomers can be used as the aforementioned low density polyethylene and olefin elastomer, and examples of the low density polyethylene include, for example, "MORETEC 0628D, 0218CN" (LLDPE) made by Prime Polymer Co., Ltd., etc. Examples of the olefin elastomer include, for example, "Toughmer P" (ethylene-propylene copolymer) made by Mitsui Chemicals, Inc., etc. Among them, "Toughmer P P0180, 0280" are preferably used from the viewpoint of flim forming property.

The aforementioned low density polyethylene and olefin elastomer may be used alone or in combination of two or more thereof, respectively.

In the surface layer of the release liner according to the present embodiment, the content of the olefin elastomer is preferably within a range of 10 to 200 parts by weight, more preferably within a range of 25 to 100 parts by weight, and further preferably within a range of 50 to 75 parts by weight, based on 100 parts by weight of the low density polyethylene. The release property is improved by adding the olefin elastomer. On the other hand, the surface layer becomes more flexible as the addition amount thereof is increased, and hence there are sometimes the cases where processability is deteriorated or blocking is caused.

In the surface layer of the release liner according to the present embodiment, various additives, such as a colorant (pigment, dye), filler, lubricant, anti-aging agent, antioxidant, ultraviolet ray absorbent, flame retardant, and stabilizer, other than the aforementioned low density polyethylene and olefin elastomer, may be combined within a range not impairing the effects of the present invention.

When the release liner according to the present embodiment has a 3-layer structure in which surface layers are formed on both sides of a base layer, the surface layers on both sides may be formed of polymers or blend compositions different from each other, as far as the surface layers satisfy what has been described above. Alternatively, the surface layers on both sides preferably contain the same polymer, and further preferably contain the same composition, from the viewpoint of preventing the release liner from being curled.

(3-2-2: Base Layer)

The base layer of the release liner 18 according to the present embodiment is formed of a polyolefin resin that is a major component. The content of the polyolefin resin is preferably 50% by weight or more, and more preferably 80% by weight or more, based on the weight of the whole base layer. Because a polyolefin resin is more flexible than a polyester resin, such as polyethylene terephthalate, the following capability of the release liner with respect to a deformation of the adherend is improved by using the resin in the base layer of the release liner, thereby suppressing pop-off or peeling of the release liner while being stored or used at a high-temperature environment. In a release liner in which a polyester resin is used in the base layer, the release liner cannot follow a slight deformation of an automobile emblem made of a resin, for example, when the liner is stored in a state of being pasted to the emblem, etc., and hence there are sometimes the cases where pop-off or peeling of the release liner is caused, thereby decreasing productivity.

It is preferable that the aforementioned polyolefin resin is polypropylene (PP) or high density polyethylene (HDPE), from the viewpoint that the strength of the release liner is maintained and the processability thereof is improved. That is, the base layer of the release liner according to the present embodiment contains polypropylene (PP) and/or high density polyethylene (HDPE) preferably in an amount of 50% by weight or more, and more preferably in an amount of 80% by weight or more, based on the weight of the whole base layer. When the release liner is used, for example, in an application in which visibility toward the facing surface is required while being processed, it is preferable that the base layer is formed of a transparent or translucent resin, and it is preferable that the base layer is formed of random polypropylene. The "high density polyethylene" in the present embodiment means the polyethylene whose density according to JIS K 6922-2 is 930 (kg/m$^3$) or more (preferably 942 to 960 (kg/m)).

Commercially-available olefin resins can be used as the aforementioned olefin resin, and examples thereof include, for example: as PP, "NOBREN WF836DG3, FS3611" made by Sumitomo Chemical Co., Ltd., and "NOVATEC PP EG6D" made by Japan Polypropylene Corporation; and as HDPE, "HI-ZEX 3300F" made by Prime Polymer Co., Ltd., and "Nipolon Hard4050" made by Tosoh Corporation.

The base layer of the release liner according to the present embodiment may contain a colorant, such as a pigment, from the viewpoint of improving, by coloring, both discrimination of product numbers, etc., and operability. As the pigment, publicly-known and commonly-used organic and inorganic pigments can be used in accordance with the type of desired color. Examples of the pigment include, for example, carbon black, iron oxide, titanium oxide, titan yellow, cobalt blue, cadmium red, azo lake system (red, yellow), phthalocyanine system, and quinacridone pigment, etc.

The base layer of the release liner according to the present embodiment may contain an antistatic agent from the viewpoint of improving workability and preventing the destruction of the release layer. As the antistatic agent, publicly-known and commonly-used non-ionic antistatic agents, anionic antistatic agents, and cationic antistatic agent can be used.

The base layer of the release liner according to the present embodiment may contain, other than the aforementioned resin component, colorant, and antistatic agent, various additives, such as a filler, lubricant, anti-aging agent, antioxidant, ultraviolet ray absorbent, flame retardant, and stabilizer, within a range not impairing the effects of the present invention.

In the release liner according to the present embodiment, the thickness of each surface layer is smaller than 80 μm, preferably smaller than 30 μm, and more preferably smaller than 10 μm. When the surface layer according to the embodiment contains an olefin elastomer, the layer becomes flexible. Accordingly, as the thickness of the surface layer becomes larger, the strength and stiffness of the whole release liner are more decreased, and there is the tendency that the property of being cut of the liner is deteriorated because the surface liner extends when cut. That is, if the thickness of the surface layer becomes larger than 80 μm, the punching processability of the liner is deteriorated, and hence processing defects, such as a "whisker" and "uncut portion", are likely to be caused when cut. The lower limit of the layer thickness is not particularly limited, but when the surface layer is formed by co-extrusion, it is preferable that the thickness is 5 μm or more from the viewpoint of uniform lamination by the co-extrusion. When the surface layer is formed by coating, it is preferable that the thickness is within a range of approximately 0.1 to 5 μm.

When the release liner has a 3-layer structure having the surface layers on both sides of the base layer, the ratio between the surface layers on both sides (thickness of the surface layer having a larger thickness/that of the surface layer having a smaller thickness) is preferably smaller than or equal to 5, and more preferably smaller than or equal to 3. If the ratio is larger than 5, there are sometimes the cases where the release liner is curled.

In the release liner according to the present embodiment, the thickness of the base layer is preferably within a range of 30 to 190 μm, and more preferably within a range of 50 to 170 μm. The base layer takes the role of the strength of the release liner. If the thickness thereof is smaller than 30 μm, the strength and stiffness of the release liner are decreased, and hence there are sometimes the cases where the punching processability or operability is deteriorated. Conversely, if the thickness thereof is larger than 200 μm, the stiffness of the release liner becomes large and it becomes difficult for the liner to follow an emblem, etc., having a curved surface, and hence there are sometimes the cases where pop-off or peeling of the liner is caused.

The thickness (total thickness) of the release liner according to the present embodiment is preferably within a range of 50 to 200 μm, and more preferably within a range of 100 to 180 μm.

The Young's modulus of the release liner according to the present embodiment is preferably within a range of 150 to 700 MPa, and more preferably within a range of 200 to 500 MPa, from the viewpoint of punching processability.

The release liner according to the present embodiment can be produced by publicly-known and commonly-used sheet-forming methods, such as a melt film-forming method (T-die method, inflation method), solution film-forming method. Also, a lamination method of the release liner according to the embodiment is not particularly limited, but publicly-known and commonly-used methods, such as a co-extrusion method, dry lamination method, and wet lamination method, can be used. Among them, a co-extrusion method is preferable from the viewpoint of productivity.

The surface layer of the release liner according to the present embodiment may be subjected to mat processing. By performing mat processing on the surface, the end release property with respect to the pressure-sensitive adhesive surface and blocking prevention property are improved. Examples of a method of performing the aforementioned mat processing include, for example: a method of polishing the surface of the surface layer with a buff or sandpaper; sandblast process in which particulates, such as glass beads, carborundum, and metal particles, are strongly sprayed onto the surface of the surface layer along with pressure air to form fine dents on the surface; emboss process with an emboss roll; and method of performing chemical mat processing by using a chemical treatment, etc.

(Method of Producing Joined Body)

A method of producing a joined body according to the present embodiment comprises: applying a primer solution containing, as an effective component, at least one of chlorinated polypropylene and chlorinated polyethylene onto the surface of the adherend 12 to form the primer layer 14; pasting the pressure-sensitive adhesive layer 16 onto the primer layer 14. In the applying of a primer solution, an application amount of the primer solution is set such that the amount of the effective component of the primer layer per unit area is 0.5 [mg/cm$^2$] or less.

EXAMPLES

Hereinafter, the present embodiment will be described in more detail based on Examples, but the present invention should not be limited to these Examples.

Herein, a joined body was produced by adhering an adherend (polyvinyl chloride) on which a primer had been applied to a pressure-sensitive adhesive layer, and confirmed the adhesion reliability between the adherend and the pressure-sensitive adhesive layer. In each of Example and Comparative Example, the amount of the effective component of the primer layer per unit area is different from others. Table 2 shows the relationship between the application amount of the prime layer per unit area and a release strength in each of Examples 1 to 6 and Comparative Examples 1 to 6.

TABLE 2

| | PVC[g] | PVC + PRIMER [g] | APPLICATION AMOUNT [g] | AMOUNT/UNIT AREA (mg/cm$^2$) | RELEASE STRENGTH [N/25 mm] | RELEASE MODE IN JOINED BODY |
|---|---|---|---|---|---|---|
| EXAMPLE 1 | 12.1801 | 12.1820 | 0.0019 | 0.109 | 66.9 | COHESION FAILURE IN TAPE (PARTICULARLY PREFERRED MODE) |
| EXAMPLE 2 | 12.5949 | 12.5964 | 0.0015 | 0.086 | 70.6 | COHESION FAILURE IN TAPE (PARTICULARLY PREFERRED MODE) |
| EXAMPLE 3 | 12.2548 | 12.2555 | 0.0007 | 0.040 | 69.8 | COHESION FAILURE IN TAPE (PARTICULARLY PREFERRED MODE) |
| EXAMPLE 4 | 12.5713 | 12.5751 | 0.0038 | 0.217 | 59.8 | COHESION FAILURE IN TAPE, PARTIAL FAILURE BETWEEN PVC AND PRIMER LAYER (PREFERRED MODE) |
| EXAMPLE 5 | 12.4924 | 12.4968 | 0.0044 | 0.251 | 38.4 | FAILURE BETWEEN PVC AND PRIMER LAYER, PARTIAL COHESION FAILURE IN TAPE (PREFERRED MODE) |
| EXAMPLE 6 | 12.1820 | 12.1851 | 0.0031 | 0.177 | 40.2 | FAILURE BETWEEN PVC AND PRIMER LAYER, PARTIAL COHESION FAILURE IN TAPE (PREFERRED MODE) |
| COMPARATIVE EXAMPLE 1 | 12.1198 | 12.1383 | 0.0185 | 1.057 | 19.7 | FAILURE BETWEEN PVC AND PRIMER LAYER |
| COMPARATIVE EXAMPLE 2 | 12.1265 | 12.1509 | 0.0244 | 1.394 | 18.6 | FAILURE BETWEEN PVC AND PRIMER LAYER |
| COMPARATIVE EXAMPLE 3 | 11.9376 | 11.9655 | 0.0279 | 1.594 | 27.6 | FAILURE BETWEEN PVC AND PRIMER LAYER |
| COMPARATIVE EXAMPLE 4 | 12.2262 | 12.2356 | 0.0094 | 0.537 | 27.8 | FAILURE BETWEEN PVC AND PRIMER LAYER |
| COMPARATIVE EXAMPLE 5 | 12.4583 | 12.4696 | 0.0113 | 0.646 | 28.6 | FAILURE BETWEEN PVC AND PRIMER LAYER |
| COMPARATIVE EXAMPLE 6 | 12.4213 | 12.4312 | 0.0099 | 0.566 | 26.2 | FAILURE BETWEEN PVC AND PRIMER LAYER |

(Production of Joined Body Samples)

Polyvinyl chloride (PVC: made by Riken Technos Corp.) having a size of 50 mm×60 mm×2.0 mm (thickness) is prepared as the adherend 12. Subsequently, a primer (product name: "RC-1017" made by LORD Corporation) is applied on one of the surfaces of the adherend 12. An application area is made to be 35 mm×50 mm. When an application amount is large, the primer is applied onto the adherend with a brush, on the other hand, when the amount is small or middle, it is applied with waste cloth or wiping cloth (e.g., product name: "Savina" made by SEIREN Co., Ltd.).

The primer of each of the present Examples contains toluene (82 to 87 [wt %]) as a solvent, as well as isopropyl alcohol (5 to 10 [wt %]), cyclohexane (1 to 5 [wt %]), and modified polypropylene (1 to 5 [wt %]). The modified polypropylene contains chlorinated polypropylene as an effective component.

The primer layer 14 is formed after the primer has been applied and then dried for 30 minutes. After the primer layer 14 has been dried, the pressure-sensitive adhesive layer 16 of the acrylic pressure-sensitive adhesive tape 20 (product name: "HYPERJOINT A4008" made by NITTO DENKO CORPORATION), which has been formed by the following production method, is pasted to an area of the adherend 12 where the primer layer 14 has been formed. Thereafter, the two are press-bonded together by moving, on the upper surface of the tape 20, a roller having a weight of 5 kg in one direction, thereby allowing a sample of the joined body 10 to be formed. Herein, the width of the tape 20 is 25 mm.

(Production of Acrylic Pressure-Sensitive Adhesive Tape)

After 0.05 parts by weight of a photo-polymerization initiator (product name: "IRGACURE 651" made by Ciba Specialty Chemicals Inc.) and 0.05 parts by weight of that (product name: "IRGACURE 184" made by Ciba Specialty Chemicals Inc.) were combined into a monomer mixture in which 90 parts by weight of 2-ethylhexyl acrylate and 10 parts by weight of acrylic acid had been mixed together as monomer components, ultraviolet (UV) rays were radiated before the viscosity (BH viscometer, No. 5 rotor, 10 rpm, measured temperature: 30° C.) reached approximately 15 Pa*S. Thereby, a partially polymerized composition (syrup, hereinafter, sometimes referred to as "partially polymerized monomer syrup") was produced.

After 0.08 parts by weight of 1,6-hexanediol diacrylate (HDDA) were added to 100 parts by weight of this partially polymerized monomer syrup, 12.5 parts by weight of hollow glass balloons (average particle size: 40 μm, product name: "Fuji Balloon H-40" (made by FUJI SILYSIA CHEMICAL LTD.)) were further added based on 100 parts by weight of the partially polymerized monomer syrup.

A pressure-sensitive adhesive composition containing hollow inorganic fine particles was obtained by adding 0.7 parts by weight of a fluorochemical surfactant (product name: "Surflon S-393" (made by AGC SEIMI CHEMICAL CO., LTD) to the partially polymerized monomer syrup to which the hollow glass balloons had been added. Thereafter, a pressure-sensitive adhesive composition, in which bubbles had been mixed in a scattered manner by stirring the aforementioned pressure-sensitive adhesive composition along with the nitrogen gas introduced from a through-hole in a bubble mixing apparatus provided with the aforementioned stator having fine teeth and rotor. Herein, the volume of the bubbles was approximately 20 vol % based on the whole volume of the pressure-sensitive adhesive composition or pressure-sensitive adhesive layer.

The pressure-sensitive adhesive composition containing bubbles was applied onto the release surface of a separator. A polyethylene terephthalate substrate whose one surface is subjected to a release treatment (product name of "MRF" made by Mitsubishi Polyester Film, Inc., or "MRN" made by Mitsubishi Polyester Film, Inc.) was used as the separator.

The pressure-sensitive adhesive composition applied onto the separator was irradiated from both sides thereof for three minutes by using ultraviolet rays with an illumination intensity of 5 mW/cm$^2$ ("Black Light" made by TOSHIBA CORPORATION) [measured with a UV checker (product name of "UVR-T1" made by TOPCON CORPORATION) and at the maximum sensitivity of 350 nm], so that the pressure-sensitive adhesive composition was cured to obtain a pressure-sensitive adhesive layer having a thickness of 800 μm (acrylic pressure-sensitive adhesive tape). At the time, 0.04 parts by weight of a photopolymerization initiator with a product name of "IRGACURE 651" (made by Ciba Specialty Chemicals Inc.) was added. Also, an antioxidant (product name of "IRGANOX 1010" (Ciba Specialty Chemicals Inc.): 0.5 parts by weight), pigment (product name of "AT DN101" (Dainichiseika Color & Chemicals Mfg. Co., Ltd.): 0.02 parts by weight), and a solvent for dispersing pigment (2-ethylhexyl acrylate: 0.18 parts by weight) were added as other additive components.

The application amount of the prime layer per unit area can be calculated by the following method. As shown in Table 2, the mass of polyvinyl chloride (PVC), which is the adherend 12, is first measured. The total mass of the adherend 12, on which the primer has been applied and dried, and the primer layer 14 is then measured. Thereby, the mass of the primer layer 14 can be calculated and the application amount of the prime layer per unit area can be calculated by dividing the mass of the primer layer by the applied area.

(90° Release Test)

In a joined body of each of Examples and Comparative Examples respectively having application amounts of the prime layers per unit area different from each other, after the joined body had been aged for 30 minutes, the release strength [N/25 mm] of the pressure-sensitive adhesive tape 20 with respect to the adherend was measured by releasing the tape 20 in the 90° release direction at a tension speed of 300 mm/min under the atmosphere at 23° C. Measurement results are shown in Table 2.

Figure 3:
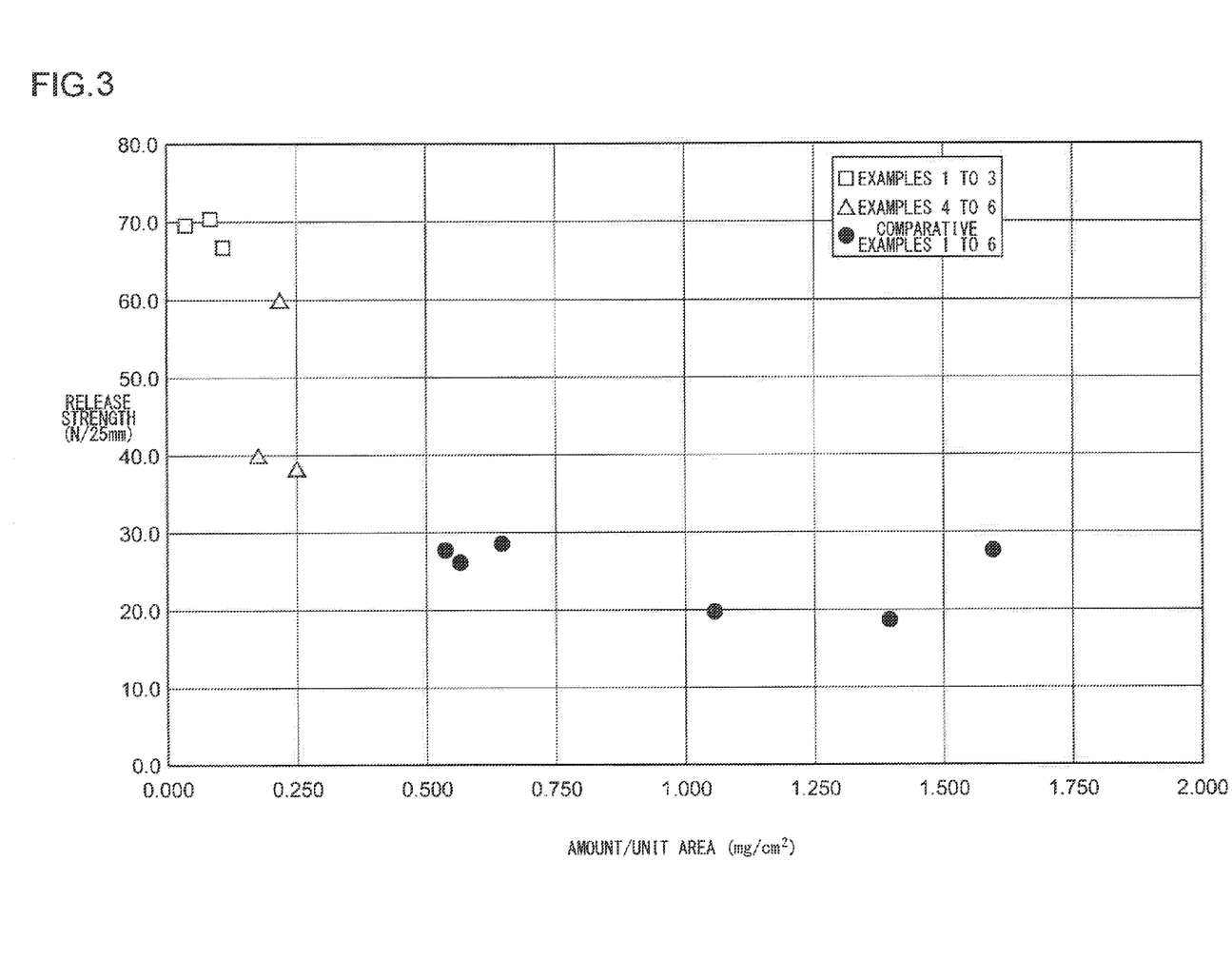
FIG. 3 is a graph showing the relationship between the amount of a primer layer per unit area and a release strength in a joined body of each of Examples and Comparative Examples.

FIG. 3 is a graph showing the relationship between the amount of the primer layer per unit area and a release strength in a joined body of each of Examples and Comparative Examples. As shown in FIG. 3 and Table 2, in the joined body of each of Examples 1 to 6 in which the amount of the primer layer per unit area is 0.5 [mg/cm$^2$] or less, a release strength is 38.4 [N/25 mm] or more, which is larger than that of a joined body of each of Comparative Examples 1 to 6. In particular, in a joined body of each of Examples 1 to 4 in which the amount of the prime layer per unit area is 0.22 [mg/cm$^2$] or less, a release strength is approximately 60 [N/25 mm] or more.

A joined body of each of Examples is configured such that, when the pressure-sensitive adhesive tape (pressure-sensitive adhesive layer) is released from the adherend, a cohesive failure of the pressure-sensitive adhesive layer itself is caused, and hence at least part of the pressure-sensitive adhesive layer remains on the surface of the adherend. That is, it can be considered that, because the pressure-sensitive adhesive force between the adherend and the pressure-sensitive adhesive layer via the primer layer is very large, release (failure) may not be caused between the adherend and the pressure-sensitive adhesive layer, so that a cohesive failure of the pressure-sensitive adhesive tape itself may be finally caused.

On the other hand, in a joined body of each of Comparative Examples, a failure is caused between the adherend and the primer layer when the pressure-sensitive adhesive tape is released from the adherend.

As stated above, by making the amount of the primer layer per unit area in a joined body to be 0.5 [mg/cm$^2$] or less, and more preferably to be 0.22 [mg/cm$^2$] or less, the adhesion reliability between the adherend and the pressure-sensitive adhesive layer can be improved.

The present invention has been described above based on the embodiments and examples. The embodiments and examples are described for exemplary purposes only, and it can be readily understood by those skilled in the art that various modifications may be made by making various combinations of the aforementioned components or processes, which are also encompassed in the scope of the present invention.

For example, embodiments made by combining the following items can also be encompassed in the present invention.

(1) A joined body comprising: an adherend; a primer layer formed on the adherend; a pressure-sensitive adhesive layer provided on the primer layer, wherein the primer layer contains, as an effective component, at least one of chlorinated polypropylene and chlorinated polyethylene and an amount of the effective component per unit area is 0.5 [mg/cm$^2$] or less.

(2) The joined body according to item (1), in which the surface of the adherend is formed of at least one of polypropylene (PP), polyvinyl chloride (PVC), and ethylene-propylene-diene rubber (EPDM).

(3) The joined body according to item (1) or item (2), in which the pressure-sensitive adhesive layer is formed of an acrylic pressure-sensitive adhesive composition that contains a fine particle and/or a bubble.

(4) The joined body according to any one of items (1) to (3), in which part of the pressure-sensitive adhesive layer remains on the surface of the adherend when the pressure-sensitive adhesive layer has been released from the adherend.

(5) A method of producing a joined body, comprising: applying a primer solution containing, as an effective component, at least one of chlorinated polypropylene and chlorinated polyethylene onto the surface of an adherend to form a primer layer; and pasting a pressure-sensitive adhesive layer onto the primer layer, in which
in the applying of a primer solution, an application amount of the primer solution is set such that an amount of the effective component of the primer layer per unit area is 0.5 [mg/cm$^2$] or less.

What is claimed is:

1. A joined body comprising:
    an adherend;
    a primer layer formed on the adherend; and
    a pressure-sensitive adhesive layer provided on the primer layer, wherein the primer layer contains, as an effective component, at least one of chlorinated polypropylene and chlorinated polyethylene and an amount of the effective component per unit area is greater than 0 [mg/cm$^2$] and 0.5 [mg/cm$^2$] or less.

2. The joined body according to claim 1, wherein the surface of the adherend is formed of at least one of polypropylene (PP), polyvinyl chloride (PVC), and ethylene-propylene-diene rubber (EPDM).

3. The joined body according to claim 1, wherein the pressure-sensitive adhesive layer is formed of an acrylic pressure-sensitive adhesive composition that contains a fine particle and/or a bubble.

4. The joined body according to claim 1, wherein part of the pressure-sensitive adhesive layer remains on the surface of the adherend when the pressure-sensitive adhesive layer has been released from the adherend.

5. A method of producing a joined body, comprising:
    applying a primer solution containing, as an effective component, at least one of chlorinated polypropylene and chlorinated polyethylene onto the surface of an adherend to form a primer layer; and
    pasting a pressure-sensitive adhesive layer onto the primer layer, wherein
    in the applying of a primer solution, an application amount of the primer solution is set such that an amount of the effective component of the primer layer per unit area is greater than 0 [mg/cm$^2$] and 0.5 [mg/cm$^2$] or less.

6. The joined body according to claim 2, wherein the pressure-sensitive adhesive layer is formed of an acrylic pressure-sensitive adhesive composition that contains a fine particle and/or a bubble.

7. The joined body according to claim 2, wherein part of the pressure-sensitive adhesive layer remains on the surface of the adherend when the pressure-sensitive adhesive layer has been released from the adherend.

8. The joined body according to claim 3, wherein part of the pressure-sensitive adhesive layer remains on the surface of the adherend when the pressure-sensitive adhesive layer has been released from the adherend.

* * * * *